US006550562B2

(12) United States Patent
Brandt et al.

(10) Patent No.: US 6,550,562 B2
(45) Date of Patent: Apr. 22, 2003

(54) HAND GRIP WITH MICROPROCESSOR FOR CONTROLLING A POWER MACHINE

(75) Inventors: Kenneth A. Brandt, Wyndmere, ND (US); Scott R. Rossow, Kindred, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/733,647

(22) Filed: Dec. 8, 2000

(65) Prior Publication Data

US 2002/0070069 A1 Jun. 13, 2002

(51) Int. Cl.[7] .......................... B60K 26/00; G05G 9/00
(52) U.S. Cl. .................................. 180/333; 74/471 XY
(58) Field of Search ..................... 180/333; 74/471 XY

(56) References Cited

U.S. PATENT DOCUMENTS

| | | | | |
|---|---|---|---|---|
| 4,051,998 A | * | 10/1977 | Zabel | 222/23 |
| 4,092,895 A | * | 6/1978 | Zabel | 84/337 |
| 4,744,218 A | * | 5/1988 | Edwards et al. | 172/2 |
| 5,042,314 A | * | 8/1991 | Rytter et al. | 180/333 |
| 5,680,099 A | * | 10/1997 | Springston | 340/461 |
| 5,687,081 A | * | 11/1997 | Wellman et al. | 701/1 |
| 5,694,318 A | * | 12/1997 | Miller et al. | 455/575 |
| 5,957,213 A | * | 9/1999 | Loraas et al. | 111/101 |
| H1831 H | | 2/2000 | Kelley et al. | 180/333 |
| 6,202,014 B1 | * | 3/2001 | Brandt et al. | 172/12 |
| 6,260,357 B1 | * | 7/2001 | Goodfellow et al. | 60/470 |
| D449,614 S | * | 10/2001 | Osborn et al. | D14/412 |

FOREIGN PATENT DOCUMENTS

| | | | | |
|---|---|---|---|---|
| EP | 0 976 879 A1 | | 9/1998 | |
| EP | 0 978 406 A2 | | 7/1999 | |
| JP | 01263323 | | 10/1989 | |
| JP | 09060044 | | 4/1997 | |
| WO | WO 93/15927 | * | 8/1993 | B60K/20/00 |

OTHER PUBLICATIONS

Automation Safety of Mobile Mining Equipment, E&MJ Engineering and Mining Journal, 196 (1995) Feb., No. 2, Chicago, IL US by: Christopher M. Keran et al.

* cited by examiner

*Primary Examiner*—Peter C. English
*Assistant Examiner*—Joselynn Y Sliteris
(74) *Attorney, Agent, or Firm*—Joseph R. Kelly; Westman, Champlin & Kelly, P.A.

(57) ABSTRACT

A control system controls actuation of a hydraulic cylinder on a skid steer loader. The control system includes a movable element, such as a hand grip. The hand grip is intelligent in that each contains a microprocessor or other digital controller which monitors user actuable elements (such as switches, buttons, paddles, etc.). The controller sends a communication signal to a main control computer. The communication signal is indicative of the state of the user actuable elements and is, in one embodiment, a serial communication signal.

22 Claims, 4 Drawing Sheets

HAND GRIP WITH MICROPROCESSOR FOR CONTROLLING A POWER MACHINE

INCORPORATION BY REFERENCE

The following U.S. Patents and Patent Applications are hereby incorporated by reference:

U.S. Pat. No. 5,425,431, issued on Jun. 20, 1995, to Brandt et al., entitled INTERLOCK CONTROL SYSTEM FOR POWER MACHINE, assigned to the same assignee as the present application; and U.S. Pat. No. 5,187,993 issued on Feb. 23, 1993, to Nicholson et al.

U.S. Pat. No. 5,577,876, issued on Nov. 26, 1996, entitled "HYDRAULIC INTERLOCK SYSTEM" and assigned to the same assignee as the present application.

U.S. patent Ser. No. 09/495,729, filed Feb. 1, 2000, entitled IMPROVED ATTACHMENT CONTROL DEVICE.

BACKGROUND OF THE INVENTION

The present invention deals with power machines. More specifically, the present invention deals with electronic controls of hydraulic cylinders on a skid steer loader.

Power machines, such as skid steer loaders, typically have a frame which supports a cab or operator compartment and a movable lift arm which, in turn, supports a work tool such as a bucket. The movable lift arm is pivotally coupled to the frame of the skid steer loader and is powered by power actuators which are commonly hydraulic cylinders. In addition, the tool is coupled to the lift arm and is powered by one or more additional power actuators which are also commonly hydraulic cylinders. An operator manipulating a skid steer loader raises and lowers the lift arm and manipulates the tool, by actuating the hydraulic cylinders coupled to the lift arm, and the hydraulic cylinder coupled to the tool. Manipulation of the lift arm and tool is typically accomplished through manual operation of foot pedals or hand controls which are attached by mechanical linkages to valves (or valve spools) which control operation of the hydraulic cylinders.

Skid steer loaders also commonly have an engine which drives a hydraulic pump. The hydraulic pump powers hydraulic traction motors which provide powered movement of the skid steer loader. The traction motors are commonly coupled to the wheels through a drive mechanism such as a chain drive. A pair of steering levers are typically provided in the operator compartment which are movable fore and aft to control the traction motors driving the sets of wheels on either side of the skid steer loader. By manipulating the steering levers, the operator can steer the skid steer loader and control the loader in forward and backward directions of travel.

It is also common for the steering levers in the operator compartment of the skid steer loader to have hand grips which support a plurality of buttons or actuable switches. The switches are actuable by the operator and are configured to perform certain functions. However, the hand grips simply contain, for example, actuable switches which are each wired to a main electronic controller or other circuit located remotely from the hand grip. This requires a fairly extensive wire harness or wiring assembly, to be incorporated into the hand grips during manufacturing. Also, different hand grips or wiring assemblies must often be used with different machine models because machine operation or functionality is slightly different or contains different options.

SUMMARY OF THE INVENTION

A control system controls actuation of a hydraulic cylinder on a skid steer loader. The control system includes movable elements, such as hand grips. The hand grips are intelligent in that each contains a microprocessor or other digital controller which monitors user actuable elements (such as switches, buttons, paddles, etc.). The controller sends a communication signal to a main control computer. The communication signal is indicative of the state of the user actuable elements and is, in one embodiment, a serial communication signal.

DETAILED DESCRIPTION OF THE PREFERRED EMBODIMENTS

Figure 1:
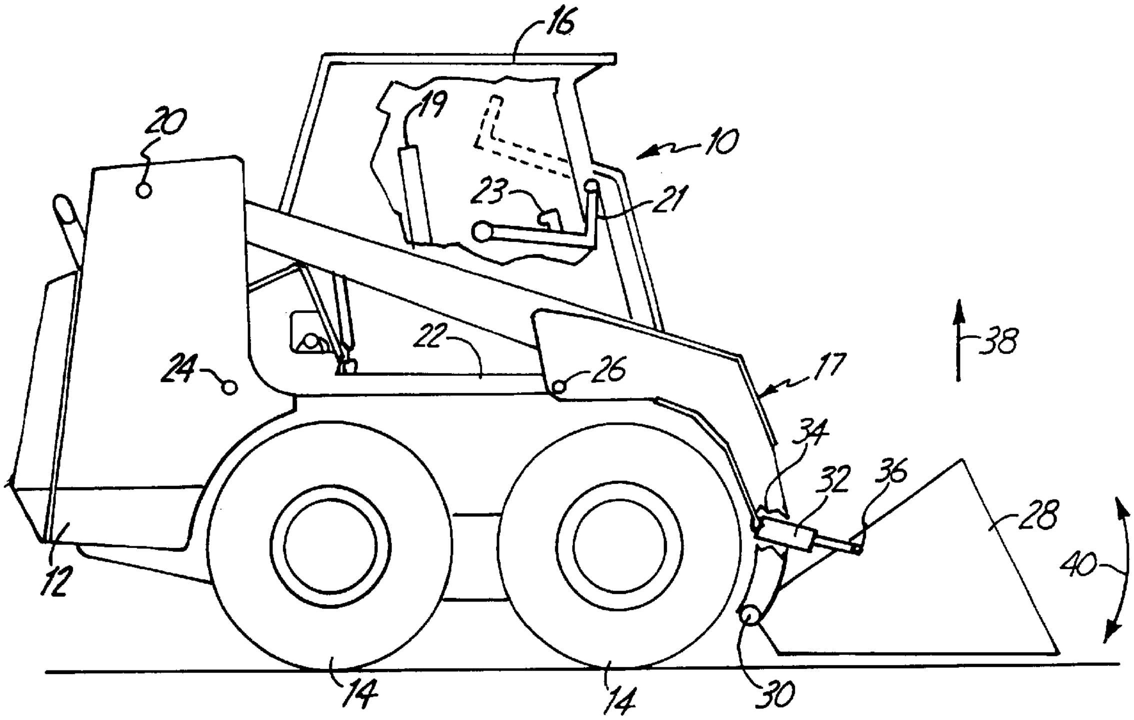
FIG. 1 is a side view of a skid steer loader according to the present invention.

FIG. 1 is a side elevational view of one embodiment of a skid steer loader 10 according to the present invention. Skid steer loader 10 includes a frame 12 supported by wheels 14. Frame 12 also supports a cab 16 which defines an operator compartment and which substantially encloses a seat 19 on which an operator sits to control skid steer loader 10. A seat bar 21 is pivotally coupled to a front or rear portion of cab 16. When the operator occupies seat 19, the operator then pivots seat bar 21 from the raised position (shown in phantom in FIG. 1) to the lowered position shown in FIG. 1.

A pair of steering levers 23 (only one of which is shown in FIG. 1) are mounted within cab 16. Levers 23 are manipulated by the operator to control forward and rearward movement of skid steer loader 10, and in order to steer skid steer loader 10. It should be noted that levers 23 can be replaced by, for example, a joystick assembly, one embodiment of which is illustrated in greater detail with respect to FIGS. 3A–3E.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is coupled to a working tool which, in this embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders can be used to work bucket 28 or any other suitable tool.

The operator residing in cab 16 manipulates lift arm 17 and bucket 28 by selectively actuating hydraulic cylinders 22 and 32. In prior skid steer loaders, such actuation was accomplished by manipulation of foot pedals in cab 16 or by actuation of hand grips in cab 16, both of which were attached by mechanical linkages to valves (or valve spools) which control operation of cylinders 22 and 32. However, in accordance with the present invention, this actuation is accomplished by moving a movable element, such as a foot pedal or a hand grip or user actuable switch or button on a hand grip on steering lever 23 or on a joystick assembly, and electronically controlling movement of cylinders 22 and 32 based on the movement of the movable element. In one embodiment, movement of the movable elements is sensed by a controller in the hand grip and is communicated to a main control computer used to control the cylinders and other hydraulic or electronic functions on a loader 10.

By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. This is also illustratively done by pivoting or actuating a movable element (such as a foot pedal or a hand grip or a button or switch on a hand grip) and electronically controlling cylinder 32 based on the movement of the element. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

While this description sets out many primary functions of loader 10, a number of others should be mentioned as well. For instance, loader 10 may illustratively include blinkers or turn signals mounted to the outside of the frame 12. Also loader 10 may include a horn and additional hydraulic couplers, such as front and rear auxiliaries, which may be controlled in an on/off or proportional fashion. Loader 10 may also be coupled to other tools which function in different ways than bucket 28. Therefore, in addition to the hydraulic actuators described above, loader 10 may illustratively include many other hydraulic or electronic actuators as well.

System Block Diagram

1. Control System 42

Figure 2:
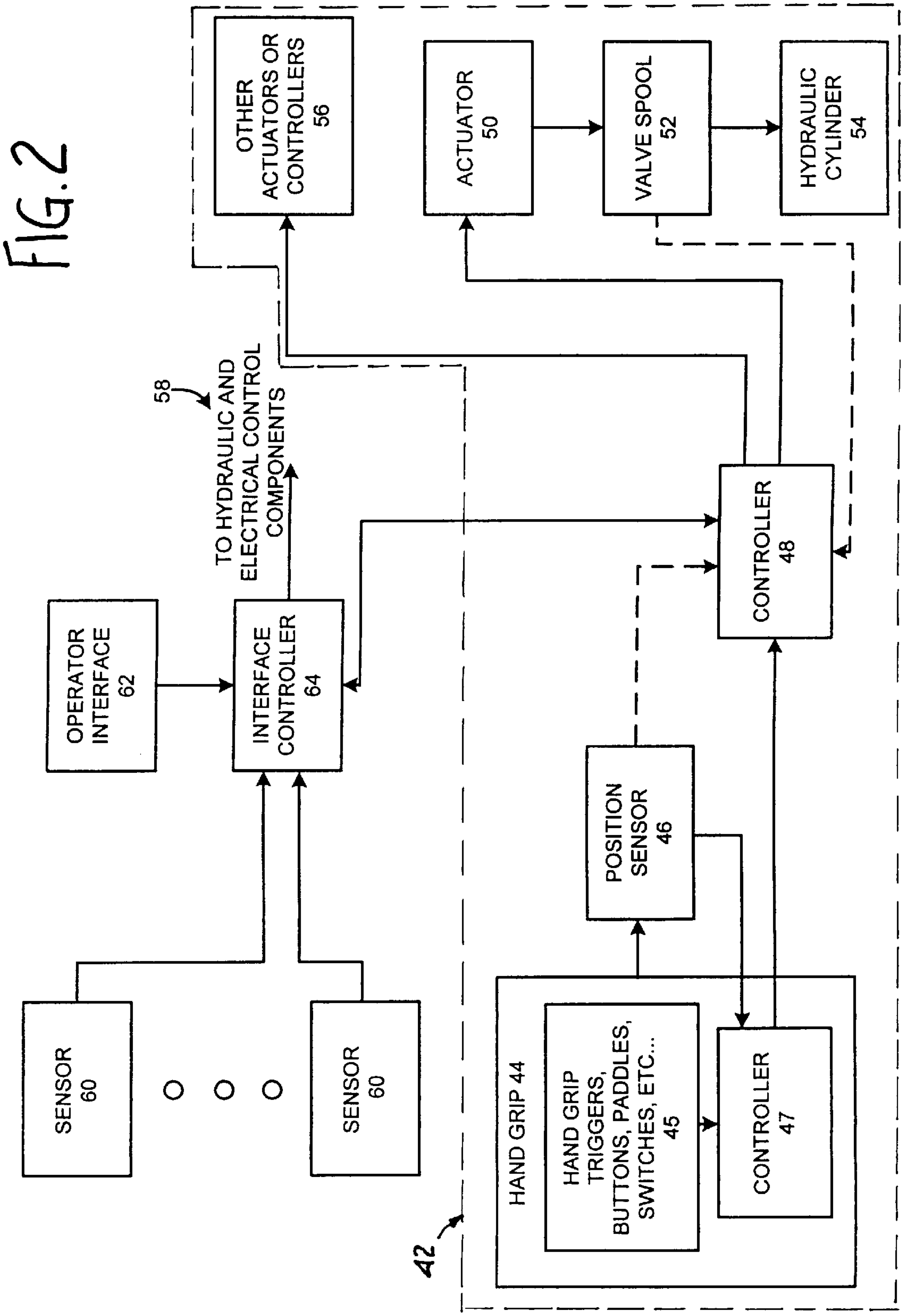
FIGS. 2 is a block diagram of one embodiment of a control system in accordance with the present invention.

FIG. 2 is a block diagram which better illustrates operation of a control system 42 according to one embodiment of the present invention. Control system 42 includes an operator moveable element such as hand grip assembly 44, user actuable buttons, switches or triggers 45 on hand grip assembly 44, a foot pedal assembly, or another suitable movable element. Control system 42 also includes position sensor 46, controller 47 mounted to hand grip assembly 44, controller 48, actuator 50, valve spool 52 and hydraulic cylinder 54, and other actuators or controllers collectively referred to by number 56. In the preferred embodiment, control system 42 is also coupled to an interface control system 58 which includes a plurality of sensors 60, an operator interface 62 and an interface controller 64.

Hand grip assembly 44 is illustratively pivotally mounted to one of steering levers 23 in loader 10 or to a joystick assembly, such as that illustrated in FIGS. 3A–3E. Position sensor 46, in one illustrative embodiment, is a potentiometer, resistive strip-type position sensor, or a Hall Effect sensor. As hand grip assembly 44 is pivoted, position sensor 46 senses movement of hand grip assembly 44 and provides a position signal indicative of the position of hand grip assembly 44. This signal is illustratively provided to controller 47 (but can alternatively be provided directly to controller 48). Controller 47 also illustratively receives signals from hand grip buttons, switches, triggers, paddles, etc . . . (collectively referred to as buttons 45). Controller 47 is illustratively a microprocessor, microcomputer, programmable controller or other type of digital controller, mounted to hand grip 44, and provides a signal, illustratively over a serial or parallel communication link, to controller 48. The signal is representative of the state of the buttons 45 and sensor 46. In one illustrative embodiment, controller 47 periodically polls the buttons 45 and sensor 46, but can be interrupt driven as well.

Controller 48 is illustratively a programmable digital microcontroller, microprocessor or microcomputer, and receives the communication signal from controller 47. Controller 48 is mounted on loader 10 remotely from controller 47, such as on or under the dash or control panel in loader 10, or to one side of the operator's compartment. In response to the position signal, controller 48 provides a control signal to actuator 50 or other actuators or controllers 56.

Actuator 50 is illustratively a linear actuator which is coupled to valve spool 52 by a suitable linkage. In response to the control signal provided by controller 48, actuator 50 moves valve spool 52 in a desired direction. It should be noted that actuator 50 can also be any suitable actuator such as, for example, one which is integrally formed with the valve which it actuates or spool 52. The precise mode by which spool 52 is moved is not critical to the primary inventive features of the invention. Valve spool 52 is coupled to hydraulic cylinder 54 and controls flow of hydraulic fluid to hydraulic cylinder 54 in response to the output from actuator 50. In the preferred embodiment, hydraulic cylinder 54 is one of hydraulic cylinders 22 and 32. Therefore, control system 42 manipulates lift and tilt cylinders 22 and 32 based on pivotal movement of hand grip assembly 44.

Controller 48 also may illustratively receive a feedback signal which indicates the position of valve spool 52. In one embodiment, controller 48 receives the feedback signal from actuator 50 indicating the position of actuator 50. This, in turn, indicates the position of valve spool 52. In another embodiment, controller 48 receives the feedback signal from valve spool 52 which directly indicates the position of valve spool 52. Upon receiving the feedback signal from either actuator 50 or valve spool 52, controller 48 compares the actual position of valve spool 52 to the target or input position from hand grip assembly 44 and makes necessary adjustments. Thus, controller 48 illustratively operates in a closed loop fashion.

As mentioned above, controller 48 can also control other actuators and controllers 56 based on the operator inputs (and thus represented by the communication signal received from controller 47). For example, other actuators and controllers 56 can be include blinkers, a horn, valve spool actuators which control hydraulic fluid flow to front or rear auxiliary couplers, an attachment control device (ACD) used to control attachments, a proportional controller used to control hydraulic flow in a proportional or on/off fashion, or other hydraulic or electronic actuators or controllers.

2. Interface Control System 58

Interface control system 58 is described in greater detail in U.S. Pat. No. 5,425,431, issued on Jun. 20, 1995, to Brandt et al., entitled INTERLOCK CONTROL SYSTEM FOR POWER MACHINE, assigned to the same assignee as the present application, and hereby incorporated by reference. Briefly, interface control system 58 receives input signals from a plurality of sensors 60 which indicate operating parameters such as operator presence from a seat sensor, and such as seat bar position from a seat bar sensor. Interface controller 64 also receives inputs from operator interface 62 which, in one preferred embodiment, is simply an ignition switch and a display. Based on the inputs received, interface controller 64 controls certain hydraulic and electrical components in skid steer loader 10. Interface controller 64 illustratively inhibits certain operation of loader 10 until some certain combination of inputs from sensors 60 is received. For instance, upon receiving appropriate signals, interface controller 64 may enable operation of wheels 14, or may enable certain hydraulic functions performable by skid steer loader 10.

Interface controller 64 is also illustratively a digital computer, microcontroller, or other suitable controller. Interface controller 64 is connected to controller 48 by a serial bus, a parallel bus, or other suitable interconnection.

3. Interaction Between Systems 42 and 58.

Interface controller 64 is also configured to disable operations performable by controller 48 under certain circumstances. For example, upon power-up, interface controller 64 inhibits the operations performable by controller 48 until sensors 60 indicate that seat bar 21 is in the lowered position and that the operator has requested operation. At that point, interface controller 64 provides controller 48 with a signal enabling controller 48 to perform functions. If, however, sensors 60 were to indicate that the operator is not in seat 19, or that the seat bar 21 is not in the lowered position, interface controller 64 would continue to provide controller 48 with a signal inhibiting actuation of cylinders 22 or 32 until the sensors 60 provide appropriate signals. Once sensors 60 provide signals which allow controller 64 to "unlock" controller 48, controller 48 can also perform certain diagnostic or calibration functions.

While the above description has proceeded describing controllers 48 and 64 as separate controllers, it is to be understood that the functions performed by each can be combined into a single controller, or can be divided among a greater number of controllers. Such a combination or division of functions may be desirable depending on a given application.

4. Float

Controller 48 also illustratively controls cylinder 54 to accomplish another function. It may be desirable, at certain times, for the operator of skid steer loader 10 to cause lift arm 17 (or the tool, such as bucket 28) to float. By floating it is meant that there is no positive hydraulic control of the particular cylinder which is floating.

For instance, the operator of skid steer loader 10 may wish to operate skid steer loader 10 so that bucket 28, and lift arm 17, follow the terrain over which loader 10 is traveling. In that case, the operator simply actuate one of the buttons 45 on hand grip 44 the state of this button is communicated (such as over a serial link) from controller 47 to controller 48 and this indicates to controller 48 that the operator wishes to cause the particular hydraulic cylinder under control to float. In response, controller 48 provides a control signal to actuator 50 causing actuator 50 to move valve spool 52 to a position which effectively connects both hydraulic inputs to hydraulic cylinder 54 together. In this way, the oil which actuates hydraulic cylinder 54 is not pressurized and is free to move from one end of cylinder 54 to the other in response to forces exerted on the cylinder by changes in the terrain.

Hand Grip Assembly 44

Figure 3A:
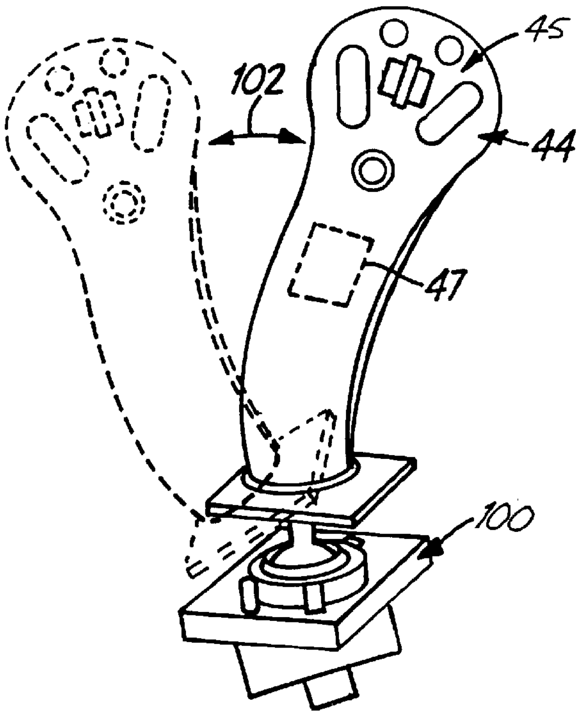
FIGS. 3A–3E illustrate a hand grip assembly and button configuration according to one embodiment of the present invention.
Figure 3B:
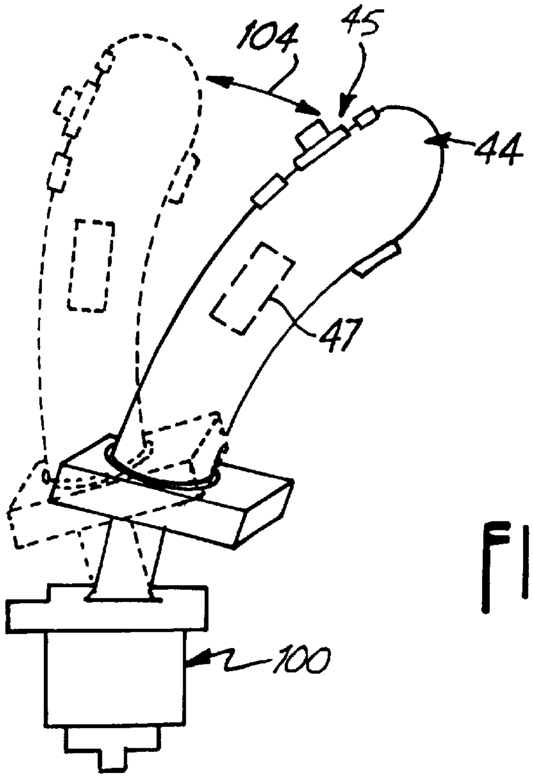

FIGS. 3A and 3B illustrate one embodiment of a hand grip 44 coupled to a joystick assembly 100. In FIG. 3A, hand grip 44 is viewed from the rear (or operator) side, illustrating buttons 45. FIG. 3B is illustrated from the operator's right hand side.

Both FIGS. 3A and 3B illustrate phantom figures which show hand grip 44 pivoted from its neutral position. In FIG. 3A, hand grip 44 is pivoted to the operator's left hand side (as shown in phantom) in the direction indicated by arrow 102. Of course, it will be noted that hand grip 44 can be pivoted to the user's right hand side as well. FIG. 3B shows hand grip 44 pivoted in the aft direction (toward the user as shown by arrow 104) as also shown in phantom. Of course, hand grip 44 can also be pivoted in the forward direction.

In one illustrative embodiment, the range of motion (from the solid image to the phantom image shown in both FIGS. 3A and 3B) is approximately 4.25 inches, and is offset by an angle of approximately 20 degrees. It should also be noted that, in one embodiment, joystick assembly 100 is a commercially available joystick assembly produced and available from the Sauer Company.

FIGS. 3A and 3B also schematically illustrate controller 47 which is embedded within hand grip 44. In one illustrative embodiment, controller 47 is contained in a module with associated memory, that is embedded within the interior of hand grip 44 while a flex circuit couples buttons 45 to controller 47. In one embodiment, the exterior of hand grip 44 is hard or soft plastic or rubber, or a hard material with a friction increasing surface (such as texture or a softer gripping material) disposed where the user's hand engages the hand grip 44, such as under the palm region, the finger region and/or the finger tip region. The controller 47 (and possibly an associated circuit board) are illustratively, securely attached within an inner cavity of hand grip 44 through adhesive, screws, clamps or another mechanical attachment mechanism. In one illustrative embodiment, a three conductor serial communication link is provided between controller 47 and controller 48. The three conductors include power, ground, and a serial communication conductor. In another embodiment, controller 47 includes a wireless transmitter while controller 48 includes a wireless receiver. Wireless communication is then effected between the two using radiation, such as radio signals, infrared signals or other electromagnetic radiation.

Figure 3C:
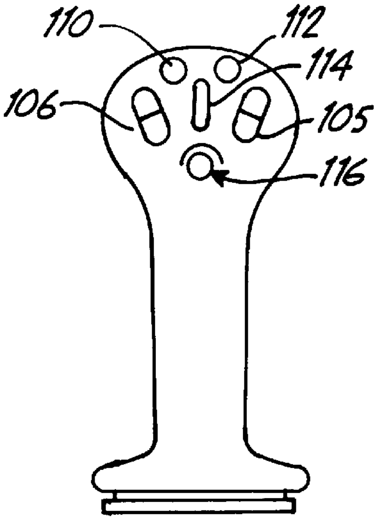
Figure 3D:
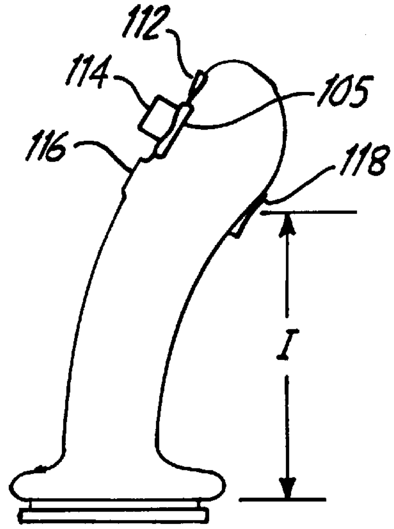

FIGS. 3C and 3D better illustrate the arrangement of buttons 45 on hand grip 44. Buttons 45 include a pair of rocker switches 106 and 108, a pair of push button toggle switches 110 and 112, a paddle 114, a push button toggle switch 116, and a trigger 118. Both the left and right hand grips 44 are, in one illustratively embodiment, identical. Therefore, only the right hand grip 44 is illustrated in FIGS. 3A–3E.

In one illustrative embodiment, the buttons 45 on the left hand grip 44 control a number of functions, including the left blinker, a stability override function, a left ski up and left ski down function, the rear auxiliary control, a boom extension function, the horn and, for an all wheel drive machine, a driving mode change function. For example, in one embodiment, switch 110 is the left blinker switch. Therefore, when the operator depresses button 110, the left blinker turns on, and when the operator again depresses button 110, the left hand blinker turns off. Rocker switch 105 controls the raising and lowering of skis coupled to an attachment. The rocker switch 106 controls a side shift function associated with the rear auxiliaries, paddle 114 controls a boom extension function, push button 116 controls the horn, and trigger 118 controls the steering mode change.

In one illustrative embodiment, the right hand grip 44 includes a number of different functions as well. In one embodiment, push button 110 is a spare user input, while push button 112 controls the right hand blinker. Rocker switch 105 controls flow of hydraulic fluid to the front auxiliaries in the first direction and a second direction (depending on the position of the rocker switch), rocker switch 106 controls the loader to operate in a fast or slow mode in two speed operation (depending on the position of the rocker switch), button 116 controls the float operation, and trigger 118 provides a detent function to the auxiliary hydraulic output. It has been found that these functions, associated with these buttons, are particularly useful to users. However, it should be noted that other functions could be assigned to the buttons as well.

Figure 3E:
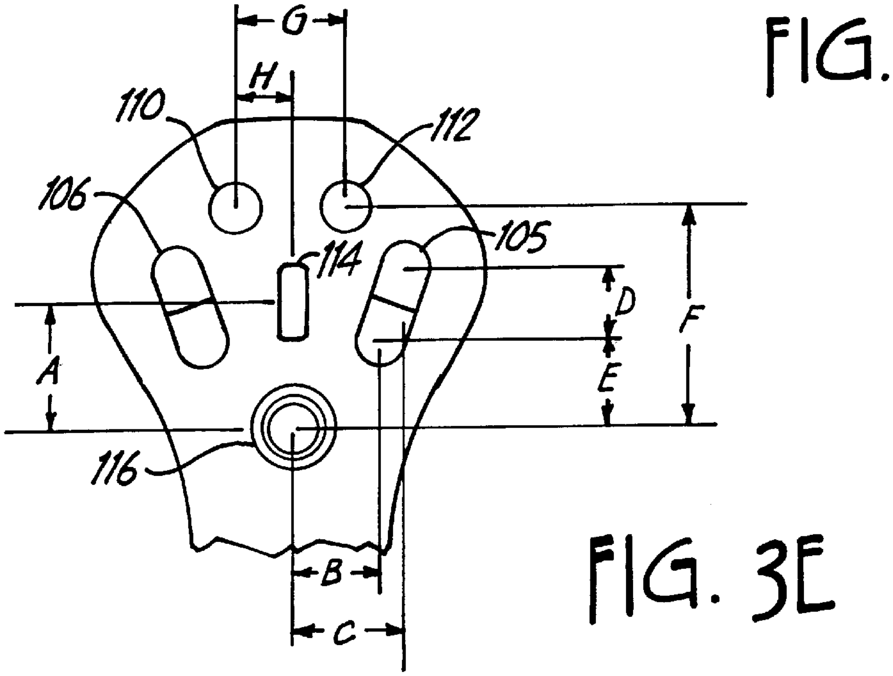

FIGS. 3D and 3E illustrate the spacing and separation of the various buttons 45, in accordance with one illustrative embodiment. It should be noted that paddle 114 is generally located centrally of buttons 45 and is easily assessable by the user's thumb. The remainder of the buttons are also within an ergonomic range which provides ease of access through a normal thumb swing from paddle 114.

Paddle 114 has a center-to-center spacing from button 116 illustrated by A in FIG. 3E. This is, in one illustrative embodiment, in a range of 0.75–1.25, and is illustratively approximately one inch. Button 116 has a center-to-center spacing from the lower pad of rocker switches 104 and 105 illustrated by B which is, illustratively, in a range of 0.5–0.9 inches and may be illustratively, approximately 0.7 inches. Similarly, button 116 has a center-to-center spacing from the upper pad of rocker switches 105 and 106 which is illustratively in a range of 0.7–1.1 inches and may be approximately 0.9 inches. The lower and upper pads of rocker switches 105 and 106 have a center-to-center spacing D which is illustratively in a range of 0.45–0.65 inches, and may be approximately 0.57 inches. The center-to-center spacing E between button 116 and the lower pad of rocker switches 105 and 106 (in the vertical direction) is in a range of approximately 0.6–0.75 inches and may be approximately 0.68 inches. Switches 116 and 110 and 112 have a center-to-center spacing in the vertical direction labeled F which is illustratively in a range of approximately 1.50–2.00 inches, and may be approximately 1.75 inches. Switches 110 and 112 have a center-to-center spacing G, in the horizontal position which is illustratively in a range of 0.60–1.00 inches, and may be 0.8 inches. Similarly, paddle 114 and switches 110 and 112 have a center-to-center spacing, in the horizontal direction, labeled H, which is illustratively in a range of 0.20–0.60 inches, and may be approximately 0.4 inches. The center of trigger 118 is also located a dimension I from the base of hand grip 44. In one illustrative embodiment, the dimension I is in a range of 4.00–5.00 inches, and may be approximately 4.54 inches. While other suitable dimensions could be used as well, it has been found that these dimensions provide an ergonomic benefit in the form of comfort and accessibility to the user.

It can thus be seen that the present invention provides a smart handle assembly in that a microprocessor is embedded in the hand grip. The microprocessor receives or senses inputs from various buttons, switches, position sensors, etc. The state of the buttons, switches, and sensors is provided to a remotely located main control computer along a communication link which may illustratively be a serial communication link. Therefore, the communication can be provided over a highly simplified wiring harness, and can be provided as, for example, serial communication, regardless of the model of the machine or the specific type of hand grip used.

Although the present invention has been described with reference to preferred embodiments, workers skilled in the art will recognize that changes may be made in form and detail without departing from the spirit and scope of the invention.

What is claimed is:

1. A control system for a power machine having actuators, the control system comprising:

a main electronic controller providing outputs to control the actuators;

a first user input device, remote from the main electronic controller, receiving user inputs; and a first input electronic controller, mounted on the first user input device and coupled for communication with the main electronic controller, receiving a signal indicative of user inputs and providing a communication signal to the main electronic controller, the communication signal being based on the user inputs.

2. The control system of claim 1 wherein the main electronic controller is configured to control the actuators based, at least in part, on the communication signal received from the first input electronic controller.

3. The control system of claim 1 wherein the first input electronic controller is coupled to the main electronic controller by a serial communication link.

4. The control system of claim 3 wherein the serial communication link comprises a wireless link.

5. The control system of claim 1 wherein the first user input device comprises:

a first plurality of finger-actuable input devices.

6. The control system of claim 5 wherein the first user input device comprises:

a first hand grip and wherein the finger-actuable input devices are mounted on the first hand grip and positioned for finger-actuation.

7. The control system of claim 6 wherein the first hand grip is mounted to a joystick assembly such that pivotal movement of the first hand grip causes movement of the joystick assembly.

8. The control system of claim 1 and further comprising:

a second user input device, remote from the main electronic controller, receiving user inputs; and a second input electronic controller, mounted on the second user input device and coupled for communication with the main electronic controller, receiving a signal indicative of user inputs and providing a communication signal to the main electronic controller, the communication signal being based on the user inputs.

9. The control system of claim 8 wherein the main electronic controller is configured to control the actuators based, at least in part, on the communication signal received from the second input electronic controller.

10. The control system of claim 8 wherein the second input electronic controller is coupled to the main electronic controller by a serial communication link.

11. The control system of claim 10 wherein the serial communication link comprises a wireless link.

12. The control system of claim 8 wherein the second user input device comprises:

a second plurality of finger-actuable input devices.

13. The control system of claim 12 wherein the second user input device comprises:

a second hand grip and wherein the finger-actuable input devices are mounted on the second hand grip and positioned for finger-actuation.

14. The control system of claim 13 wherein the second hand grip is mounted to a joystick assembly such that pivotal movement of the second hand grip causes movement of the joystick assembly.

15. A user input system mountable to a power machine to provide user inputs for controlling the power machine, the user input device comprising:

a first handle receiving user inputs; and a first input electronic controller, mounted to the first handle and coupled for communication with a remotely located electronic controller, the first input electronic controller receiving a signal indicative of user inputs and providing a communication signal based on the user inputs.

16. The user input system of claim 15 wherein the first handle comprises:

a first plurality of finger-actuable input devices.

17. The user input system of claim 16 wherein the first handle comprises:

a first hand grip and wherein the finger-actuable input devices are mounted on the first hand grip and positioned for finger-actuation.

18. The user input system of claim 17 wherein the first hand grip is mounted to a joystick assembly such that pivotal movement of the first hand grip causes movement of the joystick assembly.

19. The user input system of claim 15 and further comprising:

a second handle receiving user inputs; and a second input electronic controller, mounted on the second handle and coupled for communication with the remotely located electronic controller, the second input electronic controller receiving a signal indicative of user inputs and providing a communication signal to the main electronic controller, the communication signal being based on the user inputs.

20. The user input system of claim 19 wherein the second handle comprises:

a second plurality of finger-actuable input devices.

21. The user input system of claim 20 wherein the second handle comprises:

a second hand grip and wherein the finger-actuable input devices are mounted on the second hand grip and positioned for finger-actuation.

22. The control system of claim 21 wherein the second hand grip is mounted to a joystick assembly such that pivotal movement of the second hand grip causes movement of the joystick assembly.

* * * * *